US012090092B2

(12) United States Patent
Williams

(10) Patent No.: US 12,090,092 B2
(45) **Date of Patent: *Sep. 17, 2024**

(54) PORTABLE NEGATIVE-PRESSURE MEDICAL AND DENTAL ISOLATION CHAMBER AND PROCEDURES OF USE

(71) Applicant: Jerry K. Williams, Savannah, GA (US)

(72) Inventor: Jerry K. Williams, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,877

(22) Filed: Jan. 28, 2022

(65) Prior Publication Data

US 2022/0151853 A1 May 19, 2022

Related U.S. Application Data

(63) Continuation of application No. 16/884,642, filed on May 27, 2020, now Pat. No. 11,234,881.

(60) Provisional application No. 63/015,146, filed on Apr. 24, 2020.

(51) Int. Cl.
*A61G 10/02* (2006.01)
*A61G 10/00* (2006.01)

(52) U.S. Cl.
CPC ......... *A61G 10/023* (2013.01); *A61G 10/005* (2013.01); *A61G 2210/00* (2013.01)

(58) Field of Classification Search
CPC ............... A61M 21/0094; A61H 33/14; A61H 2033/141-148; A62B 31/00; A62B 29/00; A61B 90/05; A61B 90/40; A61B 2090/401
See application file for complete search history.

(56) References Cited

U.S. PATENT DOCUMENTS

| | | | |
|---|---|---|---|
| 3,552,391 A | 1/1971 | Deaton | |
| 3,710,791 A | 1/1973 | Deaton | |
| 3,889,670 A | 6/1975 | Loveland et al. | |
| 4,003,378 A * | 1/1977 | Pickering | A61G 10/04 128/205.17 |
| 4,949,714 A | 8/1990 | Orr | |
| 6,460,538 B1 | 10/2002 | Kemp | |
| 6,508,850 B1 | 1/2003 | Kotliar | |

(Continued)

OTHER PUBLICATIONS

Mitchell, Kyle, "Kalamazoo company makes 'cube' to protect hospital staff from COVID-19", https://www.woodtv.com/health/coronavirus/kalamazoo-company-makes-cube-to-protect-hospital-staff-from-covid-19/, (Apr. 6, 2020), 24 pgs.

(Continued)

*Primary Examiner* — Thaddeus B Cox

(74) *Attorney, Agent, or Firm* — Richard C. Pierce, Esq.; Grell & Watson Patent Attorneys LLC

(57) ABSTRACT

A portable negative air pressure apparatus for isolating a treatment subject to permit a selected treatment procedure to be performed by a treatment operator. The apparatus comprises an air source connected to a closed chamber for sealable disposition over the head, neck and upper thorax of the treatment subject with the chamber having air ports, in and out. The chamber has rigid clear sides and a plurality of sealed ports, with the ports including sealed armholes for access, and with sealed gloves connected to the sealed armholes. The chamber also has at least one instrument hatch to permit introduction into the chamber of instruments for carrying-out the selected treatment procedure.

12 Claims, 2 Drawing Sheets

(56) References Cited

U.S. PATENT DOCUMENTS

| | | | | |
|---|---|---|---|---|
| 7,406,978 | B2 | 8/2008 | Mintie et al. | |
| 7,479,103 | B2 | 1/2009 | Ellen | |
| 9,937,015 | B2 | 4/2018 | Haines et al. | |
| 9,956,325 | B2 | 5/2018 | Malhi | |
| 10,905,839 | B1 | 2/2021 | Bui | |
| 2003/0116566 | A1 | 6/2003 | Ellen et al. | |
| 2004/0111008 | A1 | 6/2004 | Perlatti | |
| 2005/0244300 | A1 | 11/2005 | Hauville | |
| 2010/0044372 | A1 | 2/2010 | Kournikakis et al. | |
| 2011/0000484 | A1 | 1/2011 | Melsheimer | |
| 2011/0240017 | A1 | 10/2011 | Butler et al. | |
| 2015/0290480 | A1 | 10/2015 | Ritchie et al. | |
| 2016/0074268 | A1 | 3/2016 | Breegi | |
| 2016/0107006 | A1 | 4/2016 | Giulianotti | |
| 2017/0231848 | A1 | 8/2017 | VanBasten | |
| 2021/0322242 | A1* | 10/2021 | Hogan | A61G 10/023 |
| 2021/0322244 | A1* | 10/2021 | Moore | E04H 15/20 |
| 2022/0370273 | A1* | 11/2022 | Klein | A61G 10/023 |
| 2023/0142819 | A1* | 5/2023 | Turer | A61M 16/0093<br>600/21 |

OTHER PUBLICATIONS

Nippon Medical & Chemistry Instruments, Co., Ltd., "Portable Isolation Bed under Negative Pressure CIB-2000S", http://www.nihonika.co.jp/en/t/e_cib-2000s.htm, (2009), 1 pg., Japan.

International Search Report and Written Opinion issued in corresponding International Application No. PCT/US2021/033811 dated Aug. 16, 2021.

"What is the Isopro Chamber—Think Inside the Box" (IsoPro Technologies LLC) Oct. 16, 2020 retrieved fro <URL: https//web.aarchive.org/web/202010161431/https://isoprochamber.com/>.

* cited by examiner

PORTABLE NEGATIVE-PRESSURE MEDICAL AND DENTAL ISOLATION CHAMBER AND PROCEDURES OF USE

CROSS REFERENCE TO RELATED APPLICATIONS

To the full extent permitted by law, the present United States Non-Provisional Patent Application hereby claims priority to and the full benefit of, U.S. patent application Ser. No. 16/884,642 filed on May 27, 2020, now U.S. Pat. No. 11,234,881, which claims priority to and the full benefit of, U.S. Provisional Application No. 63/015,146, filed Apr. 24, 2020, each entitled "Portable Negative-Pressure Medical/Dental Procedures And Isolation Chamber", which are incorporated herein by reference in their entirety.

FIELD OF THE DISCLOSURE

The present disclosure is generally related to a portable negative pressure isolation chamber. More specifically, the disclosure relates to an apparatus and methods for performing dental and/or medical procedures on a patient wherein both the patient and the dentist or doctor are protected from cross-contamination via substantial isolation by a portable, disposable, transparent negative-pressure medical/dental procedures and isolation chamber. The present disclosure is not limited to any specific device, use, or procedure.

BACKGROUND

Various forms of negative-pressure medical/dental procedure and isolation devices have existed in the prior art for performing various medical procedures on a patient. One example is shown in U.S. Pat. No. 6,508,850 which is directed to a Clean Air Tent System. Another such device is shown in U.S. Pat. No. 7,406,978 directed to an Environmental Containment Unit.

A further prior art example is set forth in US 2011/0000484 A1, which is directed to Vascular Therapy Using Negative Pressure; U.S. Pat. No. 9,956,325 B2 is directed a Canister for a Negative Pressure Wound Therapy Device; and, U.S. Pat. No. 7,479,103 B2 is directed to a Portable Procedures and Enclosure device.

Other prior art devices and methods include US 2010/0044372 A1, which is directed to Portable Collapsible Chem./Bio. Isolators; and, US 2017/0231848, which is directed to Medical Procedures and Transport Systems.

A Kalamazoo, Michigan company, Schupan Aluminum and Plastic Sales, has similarly disclosed an acrylic cube that is open at the base and the side facing the patient's body. See https://www.woodtv.com/health/coronavirus/kalamazoo-company-makes-cube-to-protect-hospital-staff-from-covid-19/.

Whereas, yet another device is a Portable Procedures Bed for moving infected patients, wherein the collapsible isolator is maintained under negative pressure, and having an exhaust system equipped with HEPA filter treated with bactericidal enzymes. See http://www.nihonika.co.jp/en/t/e_cib-2000s.htm.

However, such prior art devices and methods have had a number of defects and deficiencies, which are substantially ameliorated by the present disclosed portable negative-pressure isolation chamber and procedures thereof. Therefore, a need exists for a system and method of facilitating the synchronization of written work with accompanying audio. The instant disclosure may be designed to address at least certain aspects of the problems or needs discussed above by providing such a portable negative-pressure medical and dental isolation chamber and procedures of use.

SUMMARY

The present disclosure may solve the aforementioned limitations of the currently available systems and methods of patient isolation. In some preferred examples or embodiments, a portable, transparent negative-pressure medical/dental procedures isolation chamber fits over the patient's head, neck, torso or other parts of the body that allows the medical professionals to work on the patient, for example in a dental chair, while decreasing the risk of airborne transmission of transmissible diseases, such as COVID-19 and tuberculosis, but would also protect the staff and surrounding people from exposure to toxic substances, such as when dentists remove amalgam fillings that contain mercury.

The inventive chamber device hereof provides a clean air source to the interior thereof that uses commercially available air purification devices and provides an outflow device that pulls air out of the chamber and into an air filtration/purification system that, in turn, discharges clean air into the environment—all, while creating and maintaining a negative-pressure environment inside the chamber device.

The device has access holes that allow diaphragmatic entry points and sleeved entry into the interior of the chamber for performing procedures on the patient and allowing instruments and materials necessary for treating the patient.

The diaphragms and sleeves are disposable and the device can be easily sanitized between patients to allow rapid turnover of operatories while still maintaining a safer environment. The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

It is to be noted that the drawings presented are intended solely for the purpose of illustration and that they are, therefore, neither desired nor intended to limit the disclosure to any or all of the exact details of construction/layout shown, except insofar as they may be deemed essential to the claimed disclosure. The present disclosure will be better understood by reading the Detailed Description with reference to the accompanying drawings, which are not necessarily drawn to scale, and in which like reference numerals denote similar structure and refer to like elements throughout, and in which:

DETAILED DESCRIPTION

Figure 1:
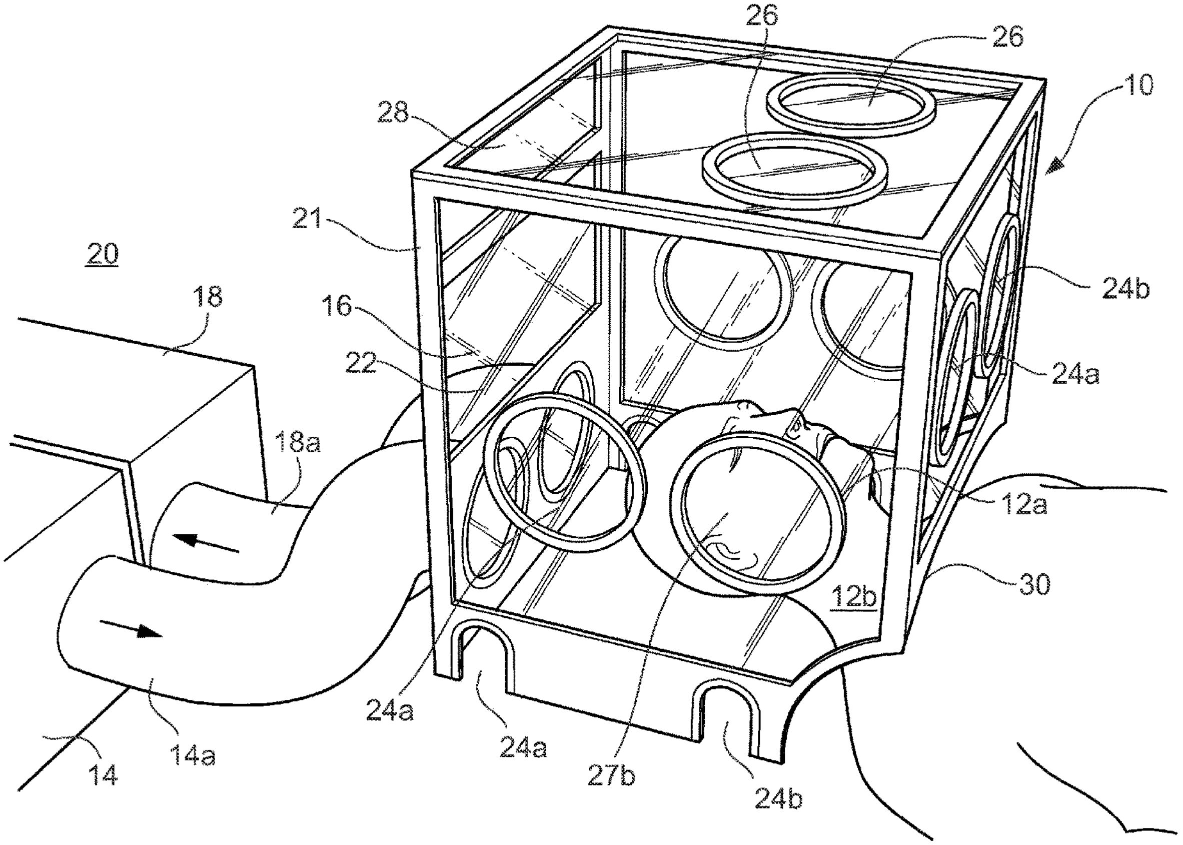
FIG. 1 is a perspective view of a preferred embodiment of the present disclosure, showing in this embodiment the chamber device disposed over the head and neck of the patient, with the chamber device having a frame and transparent walls, and including therein a plurality of access arches or holes (for hoses and the like), and a plurality of diaphragmatic entry points therein to provide access for the gloved hands of the dentist or surgeon, and further showing and air purification system, such as for example and without limitation HEPA and/or UV or other suitable air filter input and output elements.
Figure 2:
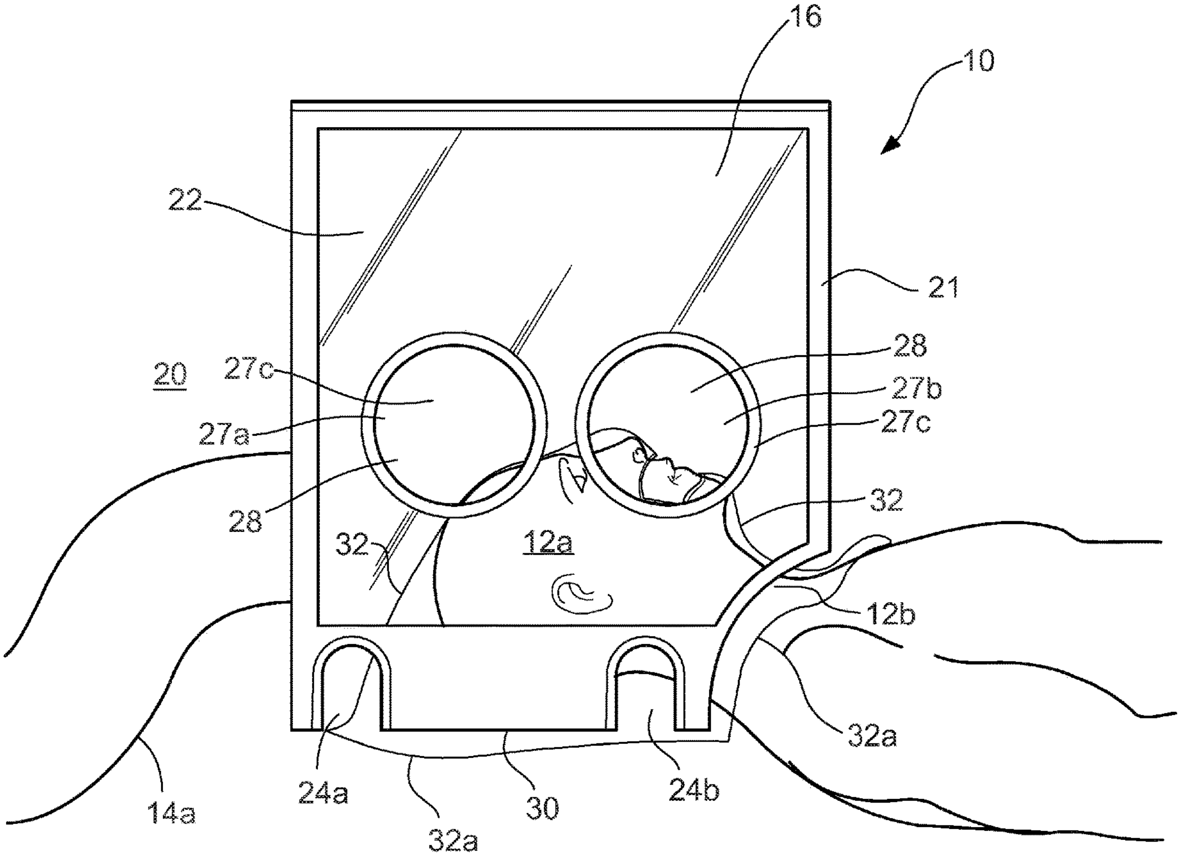
FIG. 2 is a side view of a preferred embodiment of the present disclosure, showing the chamber device, having transparent walls with access arches or holes, and a plurality of diaphragmatic entry points therein, and yet further showing a disposable and flexible patient covering.

Referring now to FIGS. 1-2, the portable negative pressure isolation chamber of the disclosure is therein illustrated. The portable negative pressure isolation chamber of the disclosure, however, may take many different forms. The drawings and the description of the portable negative pressure isolation chamber detail several preferred embodiments of the chamber of the disclosure. It should be understood that the present disclosure is to be considered as but an example of the principles of the disclosed portable negative-pressure isolation chamber and procedures thereof. The disclosure is not intended to limit the broad aspect of the portable negative pressure isolation chamber to the embodiments illustrated.

Referring now to the FIGS. 1 and 2, in one illustrated preferred example or embodiment, a portable, transparent negative-pressure medical/dental procedures and isolation chamber generally 10 (hereinafter sometimes "the chamber device 10"), that fits in this example over the patient's head and neck 12, is shown. However, the portable negative pressure isolation chamber is not limited to any particular part of the body, inasmuch as for example a leg that is infected may benefit materially from use of the present disclosed structure and methods. This structure permits the medical professionals (such as, for example, dentists, surgeons, nurses, etc.) to work on the patient's head area and/or neck areas 12*a*,12*b*. One example would be a patient disposed within a dental chair for dental treatment.

The portable, transparent negative-pressure medical/dental procedures and isolation chamber 10 of the present disclosed portable negative-pressure isolation chamber and procedures thereof functions (i) to materially decrease the risk of airborne transmission of transmissible diseases, such as COVID-19 and tuberculosis, but also, (ii) to protect the staff and surrounding persons from exposure to toxic substances, such as for example when dentists remove amalgam fillings that contain mercury.

The chamber device 10 would provide a clean air input source 14, such as for example a HEPA and/or UV or other suitable air filter source, connected by an input-hose 14*a* to the interior 16 thereof, and an outflow air filtration/purification system device 18, such as a HEPA and/or UV or other suitable air filter filtration and decontamination source, connected to chamber device 10 by output-hose 18*a* that pulls air out of interior 16 of chamber 10 and into an air filtration/purification system 18, that then discharges clean air into the environment 20 while creating and maintaining a negative-pressure environment in interior 16 of chamber device 10 to remove bacteria, viruses, and toxic substances therefrom.

Chamber device 10, which may be formed in this embodiment from a substantially rigid frame 21 and transparent walls 22 of polycarbonate or acrylic or other suitable transparent and sufficiently rigid substances, has a plurality of access arches or holes 24*a* and 24*b* thereinto and plurality of diaphragmatic entry points 26*a* and 26*b* and sleeved entry ports 27*a* and 27*b* in transparent walls 22, to provide access into interior 16 of chamber 10 to permit medical and/or dental procedures to be performed on the patient. Such sleeved entry ports 27*a*,27*b* may thus have gloves sealed around sleeved entry port peripheries 27*c* thereof. Transparent walls 22 may preferably further include an instrument hatch 28 for allowing entry thereinto of instruments and materials necessary for treating the patient.

The frame 21 may have disposable two-sided tape 30 disposed on the lower edge thereof to provide a modicum of a seal, in order to maintain a substantial negative pressure within chamber device 10, although such sealing function of chamber device 10 need not be air-tight due to the negative pressure therewithin. Of course, when the procedure upon a patient has been completed, such two-sided tape may be removed and discarded, whereupon the on-disposable elements of the disclosed portable negative-pressure isolation chamber and procedures thereof comprising the chamber 10 and the in-put and out-put hoses 14*a* and 18*a* may be disinfected with suitable means known to those of ordinary skill in the relevant medical fields.

Referring now to FIG. 2, in other preferred embodiments, a disposable and flexible patient covering 32 may be provided to cover substantially the entirety of the patient's head and neck areas 12*a*,12*b*. Such patient covering 32 includes sealing means 32*a* disposed at the periphery thereof to seal-off the patients head and neck area 12*a*, 12*b*.

The diaphragms 26 and sleeves 28 are formed from suitable disposable materials, which are known in the art. Accordingly, chamber device 10 can be easily sanitized between patients to allow rapid turnover of operatories, while still maintaining a safer environment. Deposable diaphragms 26, sleeves 28, patient cover 32 and a patient wipe (not shown) may be provided in a sealed kit to facilitate efficient use of the disclosed portable negative-pressure isolation chamber and procedures thereof hereof.

Reference in the specification to, "embodiments", "examples," "various examples," "some examples," etc. means that a particular feature, structure, or characteristic described in connection with the examples is included in at least one example of the disclosed portable negative-pressure isolation chamber and procedures thereof. The appearances of the above-referenced phrases in various places in the specification are not necessarily all referring to the same example. Reference to examples is intended to disclose examples, rather than limit the claimed disclosed portable negative-pressure isolation chamber and procedures thereof. While the disclosed portable negative-pressure isolation chamber and procedures thereof has been particularly shown and described with reference to several examples, it will be understood by persons skilled in the relevant art that various changes in form and details can be made therein without departing from the spirit and scope of the disclosed portable negative-pressure isolation chamber and procedures thereof.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the disclosed portable negative-pressure isolation chamber and procedures thereof.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not necessary to be provided herein.

It can be appreciated that, in some examples of the present methods and systems disclosed herein, a single component can be replaced by multiple components, and multiple components replaced by a single component.

Except where such substitution would not be operative to practice the present methods and systems, such substitution is within the scope of the present disclosure. Examples presented herein, including operational examples, are intended to illustrate potential implementations of the present method and system examples. It can be appreciated that such examples are intended primarily for purposes of illustration. No particular aspect or aspects of the example method, product, and/or system examples described herein are intended to limit the scope of the present disclosure.

These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. The present disclosure also relates to an apparatus for performing the operations herein.

Specific embodiments have been illustrated and described. Numerous modifications come to mind without significantly departing from the spirit of the disclosed portable negative-pressure isolation chamber and procedures thereof. The scope of protection is only limited by the scope of the subsequent Claims.

The invention claimed is:

1. A method of providing a selected treatment procedure to a treatment subject, the method comprising the steps of:

providing a portable closed chamber having a first air source port connected to an air source in and a second air source port connected to an air source out, said portable closed chamber is formed from a rigid clear polymeric material and is adapted for sealable disposition over the head, neck and upper thorax of the treatment subject, said portable closed chamber having a plurality of sealed ports, said sealed ports including an at least one sealed armhole for access thereinto said portable closed chamber, and with an at least one sealed glove connected to said at least one sealed armhole, and said portable closed chamber further including an at least one instrument hatch, said at least one instrument hatch is capable of receiving instruments for carrying out the selected treatment procedure;

substantially mateably disposing the portable closed chamber over the head, neck and upper thorax of the treatment subject;

engaging said air source to provide a negative pressure within the portable closed chamber;

introducing into the portable closed chamber an at least one treatment instrument for carrying out a selected treatment procedure;

inserting an at least one hand of a treatment operator into said at least one sealed glove to operate said treatment instrument; and gloveably performing the selected treatment procedure on the treatment subject via said at least one sealed armhole.

2. The method of claim 1, wherein said at least one sealed armhole is a first sealed armhole and a second sealed armhole.

3. The method of claim 2, wherein said at least one sealed glove connected to said at least one sealed armhole is a first sealed glove connected to said first sealed armhole and a second sealed glove connected to said second sealed armhole.

4. The method of claim 3, wherein the selected treatment procedure is selected from a group of treatment procedures, said group of treatment procedures consisting of a dental procedure, a medical procedure, a cosmetic procedure, and a haircare procedure.

5. The method of claim 1, wherein said rigid clear polymeric material is selected from a group consisting of polycarbonate and acrylic polymers.

6. The method of claim 5, wherein said portable closed chamber comprises a front wall, a back wall, a first side wall, a second side wall, and a top wall, joined together at the edges thereof.

7. The method of claim 6, wherein said at least one sealed armhole is a pair of sealed armholes on each of said front wall, said first side wall, and said top wall for gloved access into said portable closed chamber.

8. The method of claim 7, wherein installed thereon one of said front wall, said back wall, said first side wall, said second side wall, and said top wall is an at least one hose port for access of a treatment hose into said portable closed chamber.

9. The method of claim 8, wherein at least one of said front wall, said back wall, said first side wall, said second side wall, and said top wall has a curved contoured surface at a proximal portion thereof for mateable engagement with a shoulder of the treatment subject.

10. The method of claim 8, wherein said front wall has a lower surface for mateable engagement with an upper portion of a chest of the treatment subject.

11. The method of claim 1, wherein the portable closed chamber is disposable.

12. The method of claim 1, wherein said air source in and said air source out are a High Efficiency Particulate Air (HEPA) source.

* * * * *